July 10, 1934.  C. C. CURTIS  1,965,953
METHOD OF MAKING PROTECTIVE SLEEVES
Filed April 11, 1933
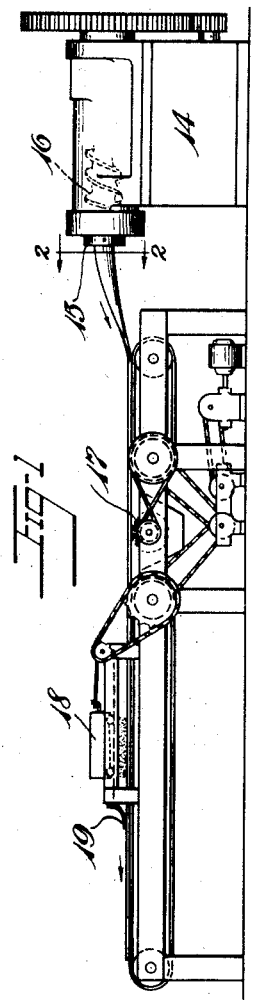
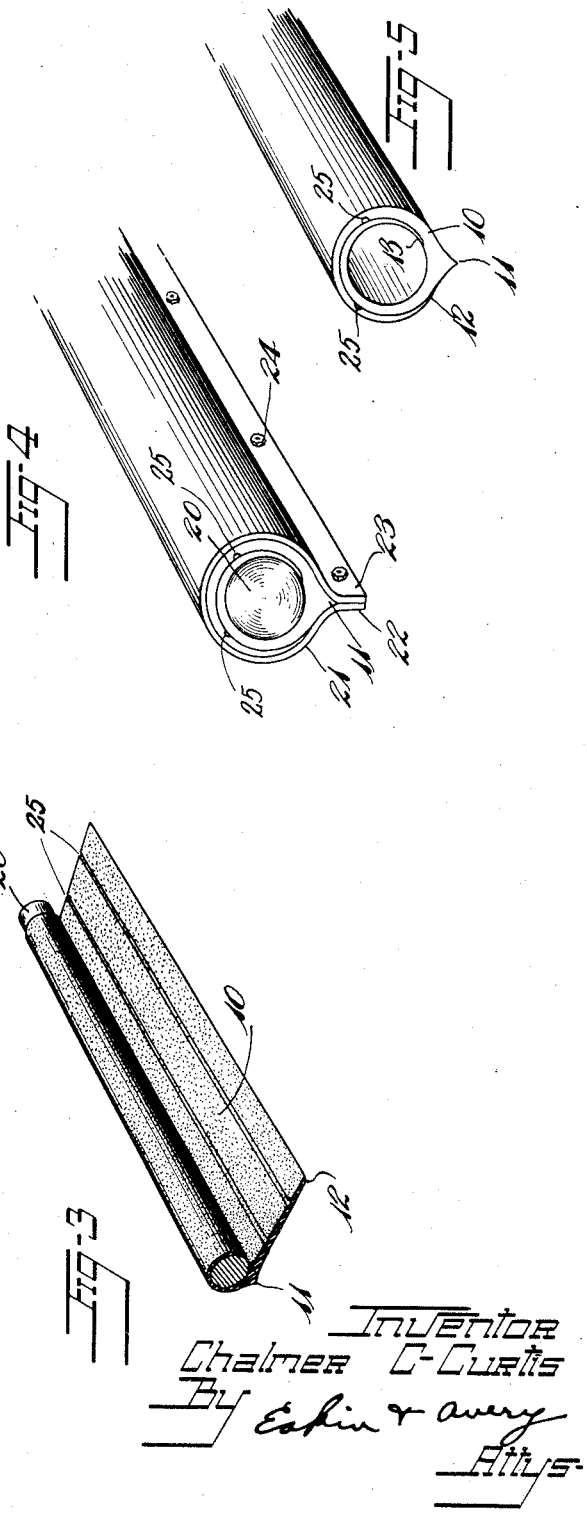
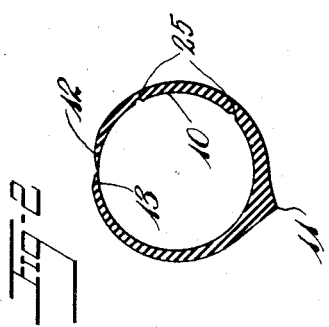
Inventor
Chalmer C. Curtis
By Eshin & Avery
Attys.

Patented July 10, 1934

1,965,953

UNITED STATES PATENT OFFICE 1,965,953

METHOD OF MAKING PROTECTIVE SLEEVES

Chalmer C. Curtis, Cuyahoga Falls, Ohio, assignor to The B. F. Goodrich Company, New York, N. Y., a corporation of New York Application April 11, 1933, Serial No. 665,511

4 Claims. (Cl. 18—55)

This invention relates to methods of making protective sleeves such as are used by electrical linemen to protect themselves from high tension lines when working in the vicinity thereof.

Such protective sleeves comprise a strip of rubber or other resilient insulating material laterally coiled on itself to provide protection in all directions when slipped over the conductor.

The principal objects of the invention are to provide for the manufacture of a superior product at low cost.

Other objects will appear from the following description and the accompanying drawing.

In the drawing:

Fig. 1 is a side elevation of apparatus used in the practicing of the method.

Fig. 2 illustrates a cross section of the article during the first step of its manufacture and taken on line 2—2 of Fig. 1.

Fig. 3 is a perspective view of the article being coiled around a mandrel.

Fig. 4 is a perspective view showing a confining sleeve applied over the coiled article and its mandrel.

Fig. 5 is a perspective view of the finished article.

Referring to the drawing, and first to Fig. 5, the protective sleeve comprises a strip of vulcanized rubber 10 having a drip ridge 11 formed along its center and having laterally tapered marginal portions 12 and 13 which are disposed, one over the other in coiled relation so as to provide a tubular article having a normally closed devious passage extending from its outer surface to its interior whereby it may be slipped over a conductor and there will retain its normal shape. The drip ridge 11 not only affords a line from which the water tends to drop but provides a weighted portion which tends to keep the sleeve in position with its marginal edges disposed in such a position as to prevent the entrance of water to its interior.

In the manufacture of such a device according to the present method a mass of rubber compound is progressively formed to the proper graduated thickness by extruding, calendering, or otherwise forming the compound. This forming readily is accomplished by the use of an extruding machine 14 having a die 15 formed to shape the compound and a screw 16 for forcing the material through the die.

As the slab is formed, its adhesive surfaces are coated with a non-adhesive lining material such as talc powder. The slab conveniently may be extruded in the form of a tube, as illustrated in Fig. 2, of larger circumference than the finished article, and may be separated at its thin portion as it emerges from the die. The tubular slab will flatten out as shown in Fig. 1 and may be passed over a brush 17 rotating in a dust box and under a shaker box 18 and distributor 19 to provide a dusted non-adhesive covering.

The formed and dusted slab is now coiled or wound laterally upon a mandrel 20 of smaller circumference than the width of the formed slab.

In order to retain the slab in its proper shape without flattening of the ridge 11, the article and mandrel are preferably confined during vulcanization in a mold or form. This mold may consist of a split sleeve 21, of sheet metal or other relatively rigid and non-extensible material, having flanges 22, 23, which may be drawn together by bolts 24 adjacent the ridge 11.

During the vulcanization of the article, the coating of soapstone dust or other lining material prevents the overlapping margins from becoming permanently attached while insuring close contact and conformity of the flanking surfaces.

The article is now vulcanized and may then be readily separated along its dusted flanking surfaces.

Where grooves such as 25 are provided in the slab to form pockets for breaking capillary creeping of moisture along the devious passage to the interior of the article, these may be filled with soapstone, metal rods, or other separating means during vulcanization of the article.

I claim:

1. The method of making a lineman's protective sleeve which comprises forming a slab of unvulcanized rubber compound with a longitudinal ridge and laterally tapered marginal portions extending therefrom, applying a coating of adhesion preventing material to its surfaces, laterally wrapping the slab around a mandrel with its marginal portions overlapping, and vulcanizing the article while so held.

2. The method of making a lineman's protective sleeve which comprises extruding a slab of unvulcanized rubber compound with a longitudinal ridge and laterally tapered marginal portions extending therefrom, applying a coating of adhesion-preventing material to its surfaces, laterally wrapping the slab around a mandrel with its marginal portions overlapping and vulcanizing the article while so held.

3. The method of making a lineman's protective sleeve which comprises extruding a slab of unvulcanized rubber compound in tubular shape with walls varying in thickness as required by the finished article but having greater lateral circumference than the finished article, dusting the surface of the slab with adhesion-preventing material, applying it to a mandrel of smaller circumference with its margins overlapping, and vulcanizing the article while on the mandrel.

4. The method of making a lineman's protective sleeve which comprises extruding a slab of unvulcanized rubber compound in tubular shape with walls varying in thickness as required by the finished article but having greater lateral circumference than the finished article, dusting the surfaces of the slab with adhesion-preventing material, applying it to a mandrel of smaller circumference with its margins overlapping, enclosing the article in a confining sleeve, and vulcanizing the article.

CHALMER C. CURTIS.